United States Patent
Thom et al.

(10) Patent No.: US 10,212,156 B2
(45) Date of Patent: Feb. 19, 2019

(54) UTILIZING A TRUSTED PLATFORM MODULE (TPM) OF A HOST DEVICE

(71) Applicant: Microsoft Technology Licensing, LLC, Redmond, WA (US)

(72) Inventors: Stefan Thom, Snohomish, WA (US); Ronald Aigner, Redmond, WA (US); Merzin Kapadia, Newcastle, WA (US); Stuart H. Schaefer, Sammamish, WA (US); Robert Karl Spiger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/658,072

(22) Filed: Jul. 24, 2017

(65) Prior Publication Data

US 2018/0131690 A1   May 10, 2018

Related U.S. Application Data

(63) Continuation of application No. 14/557,197, filed on Dec. 1, 2014, now Pat. No. 9,742,762.

(51) Int. Cl.
| | | |
|---|---|---|
| *H04L 9/00* | (2006.01) | |
| *H04L 29/06* | (2006.01) | |
| *G06F 21/64* | (2013.01) | |
| *H04L 9/08* | (2006.01) | |
| *G06F 21/57* | (2013.01) | |

(52) U.S. Cl.
CPC ........ *H04L 63/0853* (2013.01); *G06F 21/645* (2013.01); *H04L 9/0897* (2013.01); *H04L 63/0823* (2013.01); *G06F 21/57* (2013.01); *H04L 2209/76* (2013.01)

(58) Field of Classification Search
CPC ............. H04L 63/0853; H04L 63/0823; H04L 9/0897; H04L 2209/76; G06F 21/645; G06F 21/57

See application file for complete search history.

(56) References Cited

U.S. PATENT DOCUMENTS

| | | |
|---|---|---|
| 7,587,595 B2 | 9/2009 | Scarlata et al. |
| 7,613,921 B2 | 11/2009 | Scaralata |
| 7,802,111 B1 | 9/2010 | Tahan |
| 8,272,002 B2 | 9/2012 | Molina et al. |
| 9,742,762 B2 | 8/2017 | Thom et al. |
| 2005/0246552 A1 | 11/2005 | Bade et al. |
| 2009/0292919 A1 | 11/2009 | England |
| 2011/0099367 A1* | 4/2011 | Thom ................... H04L 9/0877 713/156 |
| 2011/0246785 A1 | 10/2011 | Linsley et al. |

(Continued)

OTHER PUBLICATIONS

"International Preliminary Report on Patentability", Application No. PCT/US2015/061720, dated Feb. 8, 2017, 8 pages.

(Continued)

*Primary Examiner* — Beemnet W Dada
(74) *Attorney, Agent, or Firm* — Liang IP, PLLC

(57) ABSTRACT

Techniques for utilizing a trusted platform module of a host device are described. According to various embodiments, a client device that does not include a trusted platform module (TPM) may leverage a TPM of a host device to provide trust services to the client device.

20 Claims, 9 Drawing Sheets

(56) References Cited

U.S. PATENT DOCUMENTS

2012/0311321 A1* 12/2012 Landrock .............. G06F 21/645
                                                           713/155
2013/0031374 A1   1/2013 Thom et al.
2016/0156621 A1   6/2016 Thom et al.

OTHER PUBLICATIONS

"International Search Report and Written Opinion", Application No. PCT/US2015/061720, dated Feb. 10, 2016, 12 Pages.
"Non-Final Office Action", U.S. Appl. No. 14/557,197, dated Sep. 21, 2016, 11 pages.
"Notice of Allowance", U.S. Appl. No. 14/557,197, dated Apr. 21, 2017, 15 pages.
"Second Written Opinion", Application No. PCT/US2015/061720, dated Nov. 2, 2016, 5 pages.
Berger,"vTPM: Virtualizing the Trusted Platform Module", In Proceedings of 15th USENIX Security Symposium, Feb. 14, 2006, 16 pages.
Shen,"A Method for the Trust Management in Mobile Agent System", In Proceedings of International Conference on Computer Science and Network Technology, Dec. 24, 2011, pp. 169-173.
Shen,"A Security Technology for Mobile Agent System Improved by Trusted Computing Platform", In Proceedings of Ninth International Conference on Hybrid Intelligent Systems, vol. 3, Aug. 12, 2009, pp. 46-50.
Shen,"An Improved Security Method for Mobile Agent System by Using Trusted Computing Platform", In Proceedings of International Conference on Intelligent Computation Technology and Automation, May 11, 2010, pp. 583-586.

* cited by examiner

UTILIZING A TRUSTED PLATFORM MODULE (TPM) OF A HOST DEVICE

RELATED APPLICATIONS

This application is a continuation of and claims priority to U.S. patent application Ser. No. 14/557,197, filed Dec. 1, 2014, entitled "Utilizing a Trusted Platform Module (TPM) of a Host Device", the entire disclosure of which is hereby incorporated by reference herein in its entirety.

BACKGROUND

As computers have become increasingly commonplace, increasing amounts of data have been stored on computers. This has many benefits for users, including the ability to store large amounts of data in relatively small spaces. However, some of this data is oftentimes intended to be kept secret or revealed to only certain individuals. This data can be protected in different manners, such as using passwords or personal identification numbers. Although such protection can be helpful, computers can be vulnerable to attacks such as dictionary attacks or brute force attacks where numerous attempts to guess the password or personal identification number are made. These vulnerabilities can lead to users having reduced trust in their computers, which detracts from a positive user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for utilizing a trusted platform module of a host device are described. According to various embodiments, a client device that does not include a trusted platform module (TPM) may leverage a TPM of a host device to provide trust services to the client device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
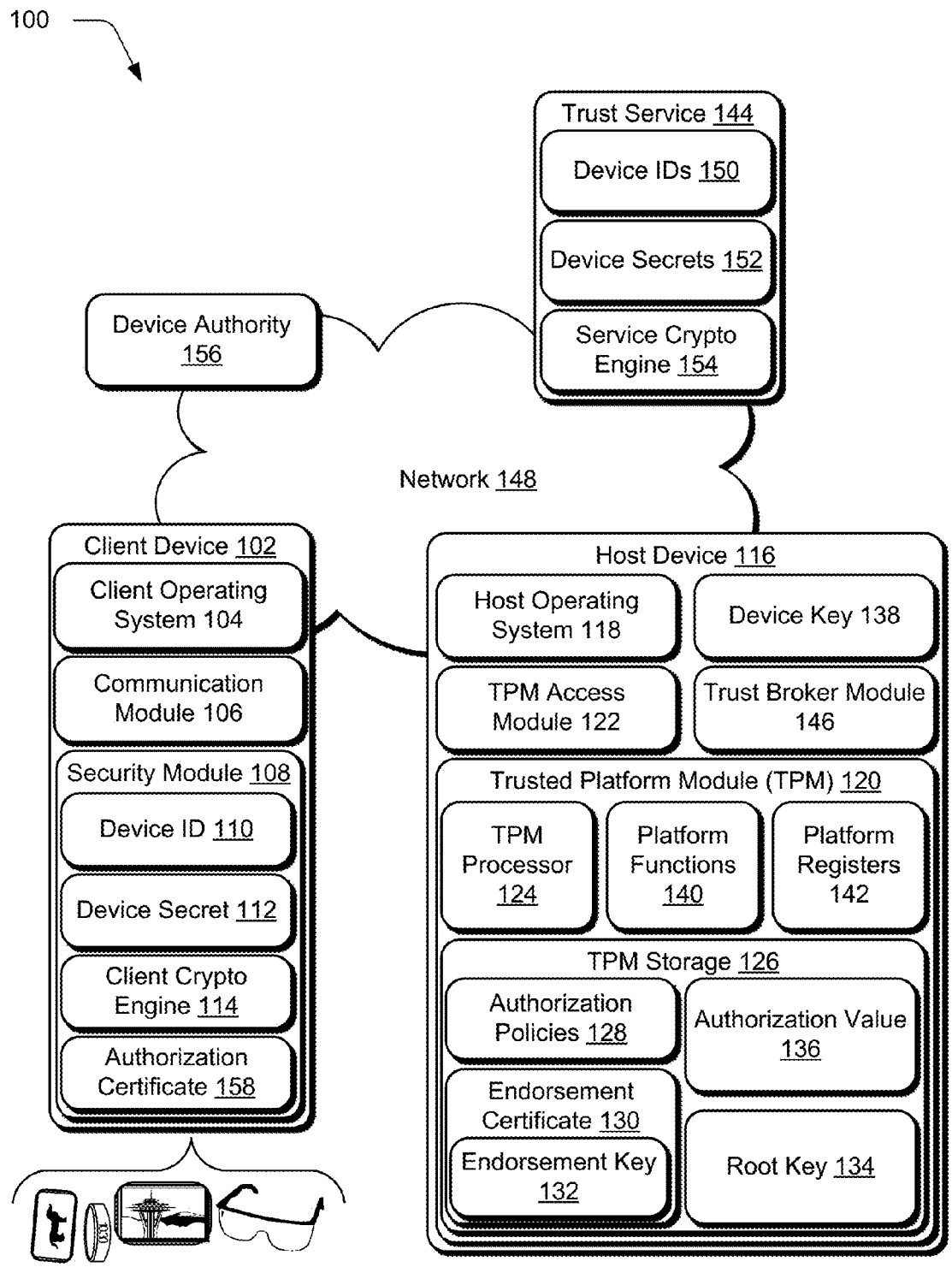
FIG. 1 is an illustration of an environment in an example implementation that is operable to employ techniques discussed herein in accordance with one or more embodiments.

Techniques for utilizing a trusted platform module of a host device are described. In various implementations, a client device that does not include a trusted platform module (TPM) may leverage a TPM of a host device to provide trust services to the client device. The client device, for instance, may be implemented as a lightweight device with fewer processing and memory resources than the host device. Thus, techniques discussed herein enable trust-based interactions between a client device and a TPM of a host device.

According to various implementations, a trust broker is implemented on a host device that brokers interactions between a client device and a TPM of the host device. The trust broker, for instance, may be implemented as executable code that is installed on the host device and that is configured to communicate with the TPM of the host device on behalf of the client device.

Implementations leverage a device secret for a client device to protect usage of a cryptographic asset of the client device. For instance, a cryptographic asset (e.g., an authorization certificate, a cryptographic key, and so forth) is stored in an encrypted form on a host device. A TPM of the host device maintains an authorization value that set to the device secret and that is used to protect usage of the cryptographic asset. For instance, a client device that requests that its cryptographic asset be used by the TPM of the host device to perform a trust command provides the device secret to the TPM, e.g., via the trust broker. The TPM then ascertains whether the device secret matches the authorization value. If the device secret matches the authorization value, the TPM utilizes the cryptographic asset to perform a requested trust command, such as to sign an authorization certificate, encrypt data, decrypt data, and so forth. Otherwise, if the device secret does not match the authorization value, usage of the cryptographic asset is denied.

Thus, manufacturing costs may be conserved by obviating the need for a TPM on a client device, while providing the client device with trusted platform module functionality via a remote service. Further, a small device with a form factor that does not allow for a locally-installed TPM may still be provided with TPM functionality via interaction with a TPM of a host device.

In the following discussion, an example environment is first described that is operable to employ techniques described herein. Next, a section entitled "Example Implementation Scenarios" describes some example scenarios for utilizing a trusted platform module of a host device in accordance with one or more embodiments. Following this, a section entitled "Example Procedures" describes some example methods for utilizing a trusted platform module of a host device in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for utilizing a trusted platform module of a host device discussed herein. Environment 100 includes a client device 102 which can be embodied as any suitable device such as, by way of example and not limitation, a smartphone, a wearable device, and so forth. In at least some implementations, the client device 102 represents a smart lightweight appliance, such as a thermostat, a humidity sensor, security hardware (e.g., cameras, motion sensors, and so forth), a light fixture, a door locking system, and so forth. Thus, the client device 102 may generally represent a lightweight device with minimal processing power and/or data storage resources. One of a variety of different examples of a client device 102 is shown and described below in FIG. 9.

The client device 102 includes a client operating system 104 and a communication module 106. Generally, the client operating system 104 is representative of functionality for abstracting various system components of the client device 102, such as hardware, kernel-level modules and services, and so forth.

The communication module 106 is representative of functionality for enabling the client device 102 to communication over wired and/or wireless connections. For instance, the communication module 106 represents hardware and logic for communication via a variety of different wired and/or wireless technologies and protocols.

The client device 102 further includes a security module 108, which is representative of functionality of the client device 102 to perform various aspects of techniques for utilizing a trusted platform module of a host device. For instance, the security module 108 includes a device identifier (ID) 110 and a device secret 112. Generally, the device ID 110 is representative of an identifier that distinguishes the client device 102 from other client devices. The device ID 110, for instance, may correspond to a randomly-generated value that is bound to the client device 102. Alternatively or additionally, the device ID 110 may correspond to a cryptographic value generated by applying the device secret 112 to a particular data value to generate the device ID 110. This is not intended to be limiting, however, and the device ID 110 may be generated in a variety of other ways while remaining within the spirit and scope of the implementations discussed herein.

Generally, the device secret 112 is representative of a cryptographic key that is generated according to any suitable cryptographic protocol. According to various implementations, the device secret 112 is permanently stored within the security module 108 and cannot be accessed by an external entity, such as the client operating system 104. The device secret 112, for instance, is stored in a programmable read-only memory (PROM) that is only accessible by the security module 108.

The client device 102 further includes a client cryptographic ("crypto") engine 114, which is representative of functionality to encrypt and decrypt data for the client device 102. According to various implementations, the client crypto engine 114 may operate according to one or more of a variety of different cryptographic protocols, such as the Secure Hash Algorithm (SHA) protocols, RSA, MD5, and so forth. In at least some implementations, the crypto engine 114 may encrypt and decrypt data utilizing a key derived using a Hash-based Message Authentication Code (HMAC).

Environment 100 further includes a host device 116 which can be embodied as any suitable device such as, by way of example and not limitation, a smartphone, a tablet computer, a portable computer (e.g., a laptop), a desktop computer, and so forth. Generally, the host device 116 is considered a "host" in that it hosts various functionalities and services for the client device 102, such as for enabling aspects of techniques for utilizing a trusted platform module of a host device discussed herein. According to various implementations, the host device 116 includes greater processing and data storage capacity than does the client device 102, and thus can provide trust-based services to the client device 102. One of a variety of different examples of a host device 116 is shown and described below in FIG. 9.

The host device 116 includes a variety of different functionalities that enable various activities and tasks to be performed. For instance, the host device 116 includes a host operating system 118. Generally, the host operating system 118 is representative of functionality for abstracting various system components of the host device 116, such as hardware, kernel-level modules and services, and so forth. The host operating system 118, for instance, can abstract various components of the host device 116 to other functionalities of the host device 116, such as to applications, services, and so forth.

The host device 116 further includes a trusted platform module (TPM) 120, which is representative of a portion of the host device 116 that protected from general access by most or all other functionalities of the host device 116. The TPM 120 can be implemented in various ways, such as a separate, dedicated hardware environment (e.g., a dedicated chip), a subdivided portion of an existing hardware environment (e.g., a sub-portion of a central processing unit (CPU)), a protected firmware environment, and so forth. In one or more implementations, the TPM 120 is a module in accordance with a Trusted Platform Module (TPM) specification available from the Trusted Computing Group (TCG). This is not intended to be limiting, however, the TPM 120 may be implemented in a variety of other ways.

According to various implementations, interaction with the TPM 120 is enabled by a TPM access module 122. Generally, the TPM access module 122 is representative of functionality to enable different components of the host device 116 to interact with the TPM 120, such as components of the host operating system 118. The TPM access module 122, for instance, represents a device driver for the TPM 120. The TPM access module 122 may be implemented in various ways, such as a component of the host operating system 118, a separate system component of the host device 116 (e.g., a kernel-level component), combinations thereof, and so forth.

The TPM 120 includes a TPM processor 124 and TPM storage 126. According to various implementations, the TPM processor 124 represents a dedicated hardware processing unit that can be leveraged by the TPM 120 to perform various processing tasks. The TPM storage 126 is representative of data storage capacity for the TPM 120 and that is protected from access by entities external to the TPM 120.

Stored on the TPM storage 126 are authorization policies 128 and an endorsement certificate 130. Generally, the authorization policies 128 are representative of different conditions, rules, parameters, and instructions for controlling access to security assets stored on the host device 116. For instance, individual authorization policies 128 may be bound to individual security assets such that access to individual security assets may be controlled via respective authorization policies 128. Examples of security assets include security keys and other cryptographic assets maintained by the host device 116.

The endorsement certificate 130 is representative of a security certificate that can be leveraged to authenticate an identity of the TPM 120 to other entities. The endorsement certificate 130, for instance, represents an endorsement key (EK) certificate of the TPM 120. The endorsement certificate 130 includes an endorsement key 132, which may be employed to encrypt and decrypt communications with other devices.

The TPM storage 126 further stores a root key 134 and an authorization value 136. The root key 134 is representative of a storage root key that is used by the TPM 120 to protect security assets maintained by the host device 116. The root key 134, for instance, can be used to "wrap" various cryptographic assets prior to the cryptographic assets being exported outside of the TPM 120.

The authorization value 136 is representative of a usage authorization value for a device key 138 associated with the client device 102. For instance, in order to allow usage of the device key 138, a requesting entity will provide the authorization value 136. In at least some implementations, the authorization value 136 is identical to the device secret 112.

TPM 120 further includes platform functions 140 and platform registers 142. The platform functions 140 represent various functions used for providing secure storage of information, such as authentication functions, key generation functions, encryption and decryption functions, context-related functions, and so forth. According to various implementations, the TPM access module 122 may interact with the platform functions 140 to generate and/or configure various aspects and attributes of the TPM 120, such as to wrap various cryptographic assets using the root key 134, to match a trust command to the authorization value 136, and so forth.

The platform registers 142 represent storage locations for storing system state and context information for the host device 116. For instance, the platform registers 142 may be leveraged to store "measurements" of various system components, such as measurements of modules of the host operating system 118 that are collected at a system boot time. In at least some implementations, the platform registers represent platform configuration registers (PCRs) of the TPM 120.

Generally, a "measurement" refers to a way of identifying and/or characterizing various device-related data, such as code modules of the host device 116, configuration data of the host device 116, and so forth. As used herein, the term "code module" generally refers to portions of executable code, such as portions of the host operating system 118, processes, various binaries and/or executables, and so forth. Examples of measurements include hash values generated from device-related data, data signatures, encrypted versions of device-related data and/or portions of device-related data, and so forth. A measurement, for instance, may be generated by applying a Secure Hash Algorithm (SHA) to device-related data, e.g., SHA-1, SHA-2, and so forth.

The environment 100 further includes a trust service 144, which is representative of functionality to provide various trust-related services for the client device 102, as well as other devices and/or entities. According to implementations discussed herein, the host device 116 includes a trust broker ("broker") module 146 which is representative of functionality for interacting with the trust service 144 on behalf of the client device 102. For example, in at least some implementations, the client device 102 does not interact directly with the trust service 144, but can trigger the trust broker module 146 to interact with the trust service 144 on behalf of the client device 102.

Generally, communication between the host device 116 and the trust service 144 occurs over network(s) 148. The network(s) 148 may assume a variety of different configurations, such as a local area network (LAN), a wide area network (WAN), the Internet, and so on. The network(s) 148, for instance, may include a combination of wired and/or wireless networks that are implemented via any suitable wired and/or wireless protocol, and/or combinations thereof. In at least some implementations, functionalities discussed with reference to the environment 100 and/or other portions of the discussion herein may be implemented in a distributed environment (e.g., "over the cloud"), as further described in relation to FIG. 9. The trust service 144, for instance, represents a cloud-based and/or distributed service that may be hosted at one or more network-based locations.

The trust service 144 maintains device IDs 150 and device secrets 152. Generally, the device IDs 150 represent identifiers for different devices, such as the client device 102.

The device secrets 152 represent secret values for different devices, such as nonces, encryption keys, decryption keys, and so forth. For instance, individual devices identified by the device IDs 150 each include a different respective instance of a device secret maintained by the device secrets 152. According to various implementations, a device secret 152 for a particular device may be located by performed a look up on the device secrets 152 using the device ID for the particular device.

The trust service 144 further includes a service cryptographic (crypto) engine 154, which is representative of functionality to perform various cryptographic functions for the trust service 144. For instance, the service crypto engine 154 may perform encryption and decryption tasks. According to various implementations, the service crypto engine 154 may operate according to one or more of a variety of different cryptographic protocols, such as the SHA protocols, RSA, MD5, and so forth. In at least some implementations, the service crypto engine 154 may encrypt and decrypt data utilizing an HMAC-derived key.

Further illustrated as part of the environment 100 is a device authority 156, which is representative of an entity that has certain security privileges and/or responsibilities with regard to the client device 102. The device authority 156, for instance, represents a manufacturer of the client device 102. Alternatively or additionally, the device authority 156 represents an entity that administrates and/or maintains the client device 102, such as for issuing updates for components of the client device 102 (e.g., for software, firmware, and so forth), for issuing security assets for the client device 102, for repairing the client device 102, and so on.

The client device 102 further includes an authorization certificate 158, which is stored as part of the security module 108. Generally, the authorization certificate 158 represents a security certificate that may be utilized by the client device 102 for various purposes, such as authenticate an identity of the client device 102 with a third party. In at least some implementations, the authorization certificate 158 is generated by the trust service 144 and provisioned to the client device 102 via the trust broker module 146. The authorization certificate 158 may be implemented in various ways, such as according to the X.509 certificate standard.

Having described an example environment in which the techniques described herein may operate, consider now a discussion of an example implementation scenario in accordance with one or more embodiments.

Example Implementation Scenarios

This section describes some example implementation scenarios in accordance with one or more implementations. The implementation scenarios may be implemented in the environment 100 described above, and/or any other suitable environment.

Figure 2:
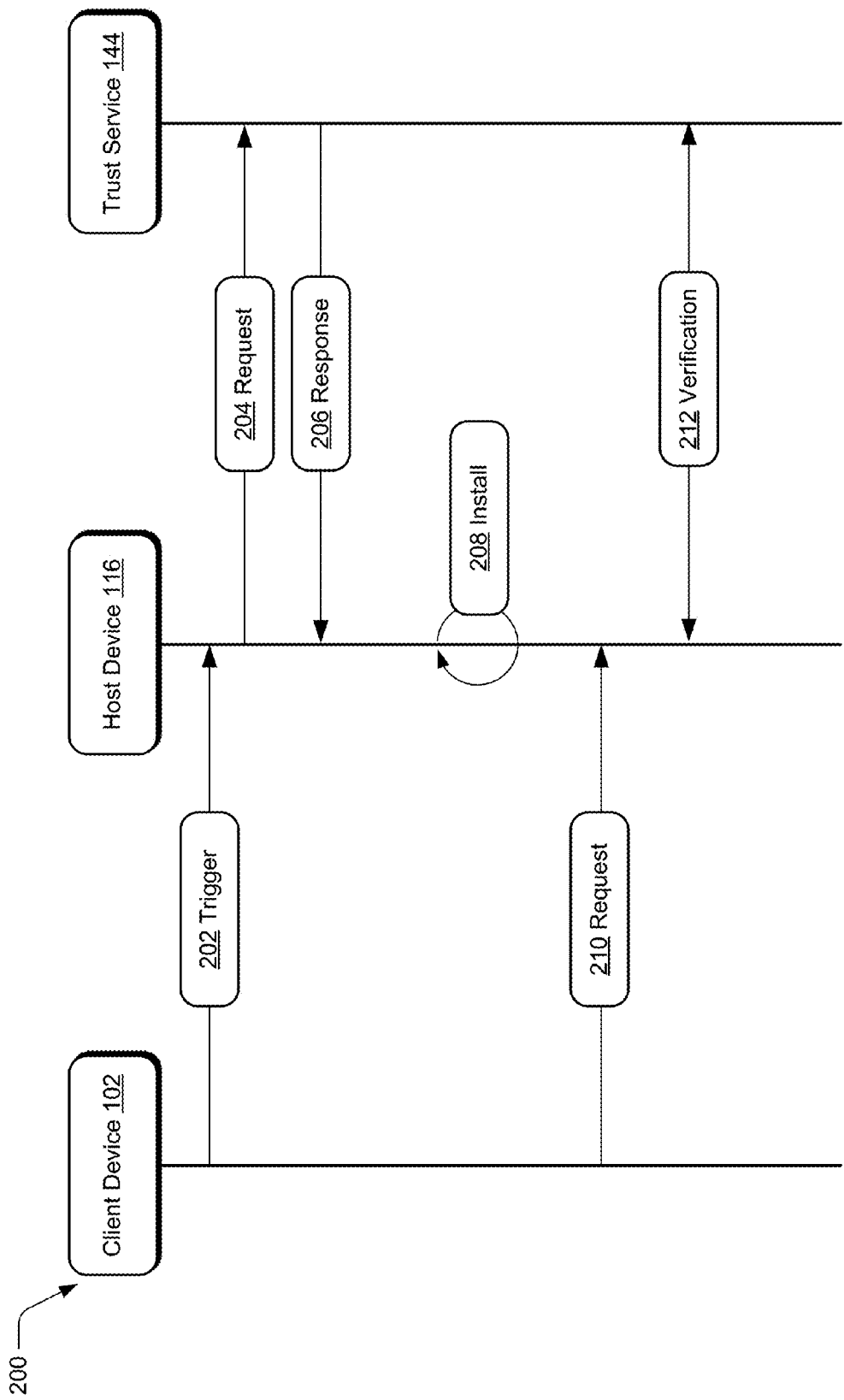
FIG. 2 depicts an example implementation scenario for enabling a TPM of a host device to provide trust services for a client device in accordance with one or more embodiments.

FIG. 2 illustrates an example implementation scenario 200 for enabling a TPM of a host device to provide trust services for a client device in accordance with one or more implementations. In at least some implementations, the scenario 200 occurs when the client device 102 is initially installed and/or powered-on, such as further to an initial out-of-box experience for the client device 102. The scenario 200, for instance, may represent a first power-on event for the client device 102 after it leaves a manufacturing facility.

In the scenario 200, the client device 102 communicates a trigger event 202 to the host device 116. The trigger event 202, for instance, instructs the host device 116 to communicate with the trust service 144 and obtain functionality for performing various trust services for the client device 102. In at least some implementations, the trigger event 202 includes a link (e.g., a hyperlink) to the trust service 144.

In response to the trigger event 202, the host device 116 communicates a request 204 to the trust service 144 for functionality for providing trust services for the client device 102. In at least some implementations, the request 204 is communicated via a link to the trust service 144 retrieved from the trigger event 202.

The trust service 144 then communicates a response 206 to the host device 116 that includes the broker module 146. The host device 116 performs an installation procedure 208 to cause the broker module 146 to be installed on the host device 116.

Continuing with the scenario 200, the client device 102 communicates a request 210 to the host device 116 to initiate a verification procedure for verifying whether the TPM 120 is trusted such that it may be leveraged to provide trust services for the client device 102. The request 210 includes the device ID 110. In response to receiving the request 210, a verification procedure 212 is performed between the client device 102 and the trust service 144. In at least some implementations, the verification procedure 212 is moderated by the broker module 146.

Generally, the verification procedure 212 includes communicating the endorsement certificate 130 from the TPM 120 to the trust service 144. The trust service 144 utilizes the endorsement certificate 130 to verify whether the TPM 120 is a trusted TPM. For instance, the trust service checks whether the endorsement certificate 130 is issued by a trusted authority, such as by a trusted certificate authority and/or a trusted TPM manufacturer. Assuming that the endorsement certificate 130 is found to be valid and trusted, the TPM 120 is determined to be trusted to provide trust services for the client device 102.

Figure 3:
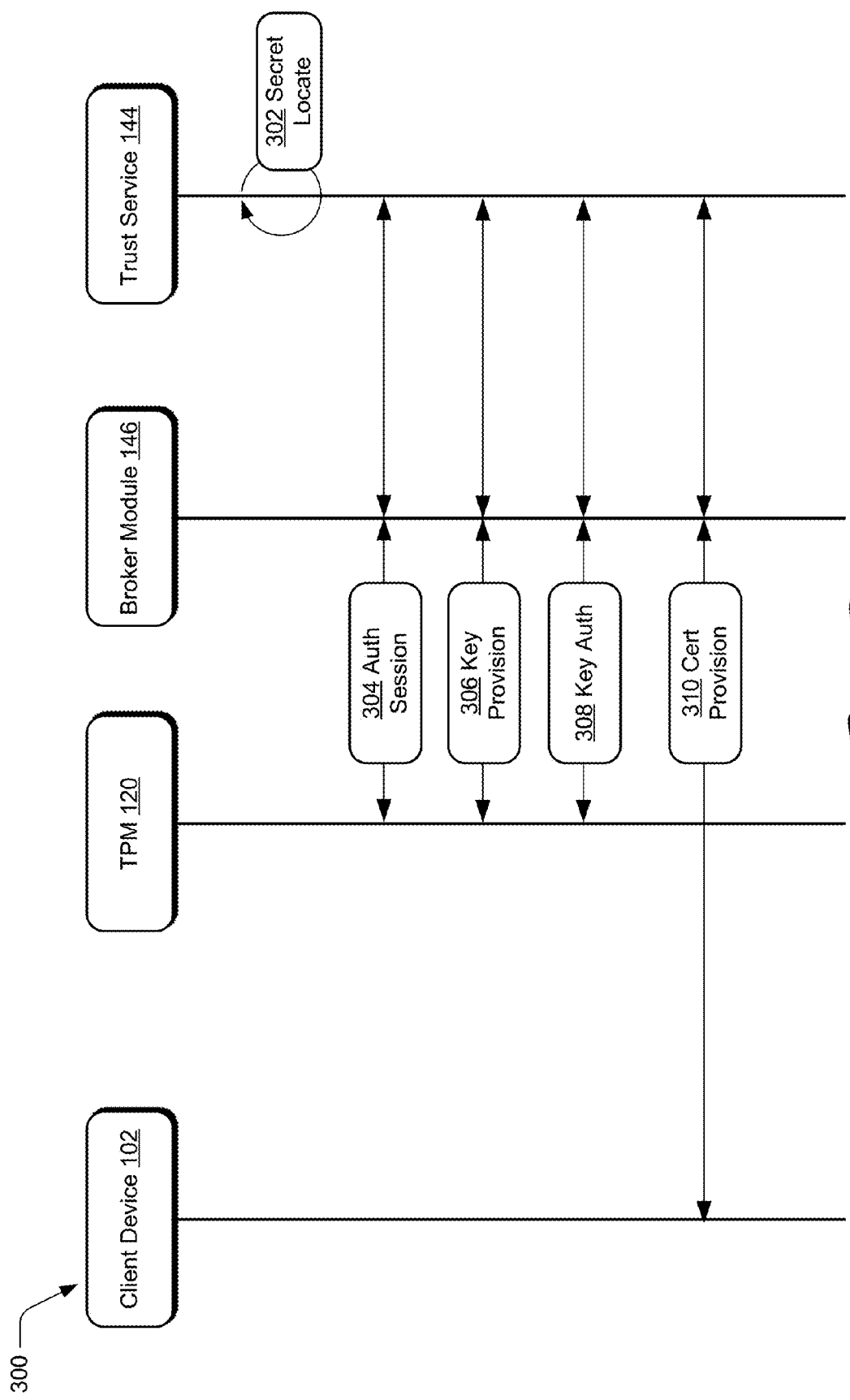
FIG. 3 depicts an example implementation scenario for provisioning a host device and a host device TPM in accordance with one or more embodiments.

FIG. 3 illustrates an example implementation scenario 300 for provisioning a host device and a host device TPM in accordance with one or more implementations. In at least some implementations, the scenario 300 occurs subsequent to and represents an extension of the scenario 200 described above.

In the scenario 300, the trust service 144 utilizes the device ID 110 to perform a secret locate procedure 302 to locate a device secret 112 for the client device 102. For instance, the trust service 144 utilizes the device ID 110 to perform a lookup on the device secrets 152 to locate the device secret 112. Once the device secret 112 is located, an authorization session initiation procedure 304 is performed to cause an authorization session to be initiated between the trust service 144 and the TPM 120. Generally, the authorization session enables secure exchange of data between the trust service 144 and the TPM 120. As illustrated in FIG. 3, various interactions between the trust service 144 and the TPM 120 are brokered by the broker module 146.

According to various implementations, data exchanged as part of the initiation procedure 304 and subsequent communication between the trust service 144 and the TPM 120 is encrypted using the endorsement key 132 from the endorsement certificate, e.g., the public portion of the endorsement key 132. The authorization session, for instance, involves the trust service 144 reading the public portion of the root key 134 to ascertain whether the root key 134 is trusted.

Continuing with the scenario 300, the trust service 144 causes a key provision procedure 306 to be performed such that the device key 138 for the client device 102 is generated and provisioned on the TPM 120. The key generate provision 306 may be performed in various ways. For instance, the trust service 144 can generate the device key 138 itself and communicate the device key 138 to the client device 102 for provisioning on the TPM 120. In such an implementation, the device key 138 is imported from the trust service 144 to the TPM 120, and is wrapped using the root key 134. Alternatively, the trust service 144 can notify the TPM 120 to generate the device key 138 utilizing the root key 134.

Once the device key 138 is generated, a key authorization ("auth") procedure 308 is performed that causes the usage authorization value 136 for the device key 138 to be set to the device secret 112. In an implementation where the device key 138 is generated by the trust service 144, the device key 138 and the authorization value 136 can be bound together and encrypted prior to being communicated to the TPM 120. In an implementation where the device key 138 is generated by the TPM 120, the authorization value 136 can be encrypted (e.g., using parameter encryption) by the trust service 144 prior to be communicated to the TPM 120.

Further to the scenario 300, a certificate ("cert") provision procedure 310 is performed for the authorization certificate 158. For instance, the trust service 144 generates the authorization certificate 158 for the device key 138 and communicates the authorization certificate 158 to the host device 116. The broker module 146 then communicates the authorization certificate 158 to the client device 102. Thus, the device key 138 and the authorization certificate 158 may now be utilized as a trusted identity for the client device 102 and to provide trust services for the client device 102, examples of which are described below.

Figure 4:
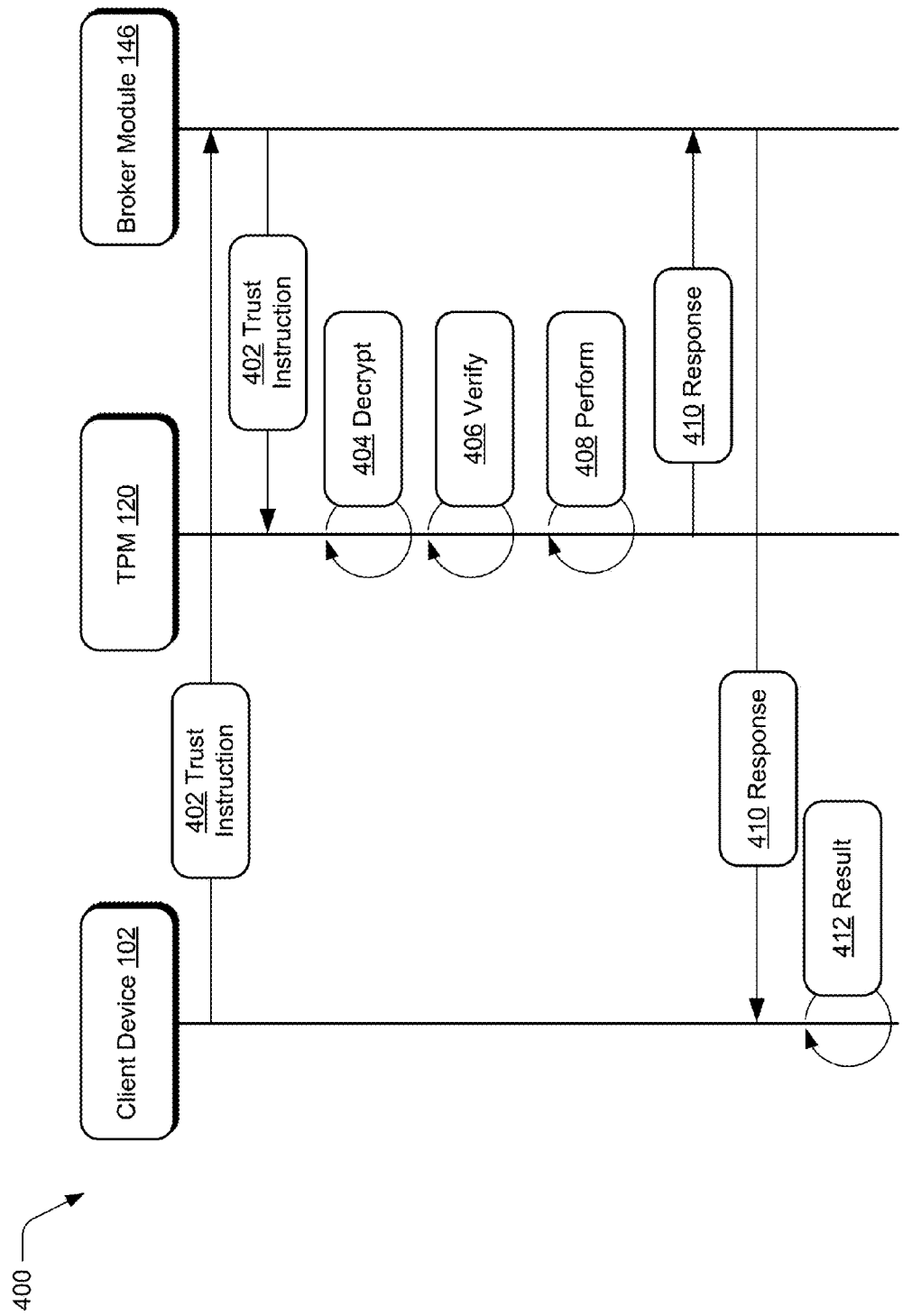
FIG. 4 depicts an example implementation scenario for causing a trust command to be performed in accordance with one or more embodiments.

FIG. 4 illustrates an example implementation scenario 400 for causing a trust command to be performed in accordance with one or more implementations. In at least some implementations, the scenario 400 occurs subsequent to and represents an extension of the scenarios 200, 300 described above.

In the scenario 400, the client device communicates a trust instruction 402 to the broker module 146 on client device 102. Generally, the trust instruction 402 includes a trust command for a particular trust-based action. Various types of trust commands may be requested, such as verifying an identity of the client device 102 to a third party (e.g., using the authorization certificate 158), encrypting data to be sent to a third party, decrypting encrypted data sent from a third party, and so forth. Generally, various trust commands available from a trusted platform module may be requested.

According to various implementations, the trust instruction 402 includes the device secret 112 and data that describes the trust command, and is encrypted by the client crypto engine 114 prior to being communicated to the host device 116. For instance, data of the trust instruction 402 may be generated by applying an HMAC function to the device secret 112 and data describing the requested trust command. In at least some implementations, the encryption is performed using a session-based secret generated using the device secret 112.

In response to receiving the trust instruction 402, the broker module 146 forwards the request 402 to the TPM 120. The TPM 120 then decrypts 404 the trust instruction 402 (e.g., using a session secret) to reveal the device secret 112 and data describing the trust command. Generally, the trust command specifies a trust action to be performed using the device key 138, such as a command to sign the authorization certificate 158 with the device key 138 to authenticate the identity of the client device 102 to a third party.

Proceeding with the scenario 400, the TPM 120 performs a secret verification procedure 406 to ascertain whether the device secret 112 from the trust instruction 402 matches the authorization value 136 for the device key 138. Responsive to determining that the device secret 112 matches the authorization value 136, the TPM 120 performs 408 the requested command using the device key 138. The TPM 120 then generates a command response 410 that includes a result of performing the trust command, such as the authorization certificate 158 signed with the device key 138. In at least some implementations, the command response 410 is encrypted by the TPM 120, such as using a session secret shared by the TPM 120 and the client device 102.

The TPM 120 then passes the command response 410 to the broker module 146, which then causes the command response 410 to be communicated to the client device 102. The client device 102 then decrypts the command response 410 to expose a command result 412 that corresponds to a result of performing the trust command, such as a signed version of the authorization certificate 158, decrypted data, encrypted data, and so forth. Thus, implementations provide ways for brokering trust services for various device, such as lightweight devices that do not have locally installed TPMs.

Having described some example implementation scenarios that may employ techniques described herein, consider now a discussion of some example procedures in accordance with one or more embodiments.

Example Procedures

The following section describes some example procedures utilizing a trusted platform module of a host device in accordance with one or more embodiments. The example procedures may be employed in the environment 100 of FIG. 1, the system 900 of FIG. 9, and/or any other suitable environment. According to one or more implementations, the procedures describe example ways for performing various aspects of the example implementation scenarios described above. In at least some implementations, steps described for the various procedures are implemented automatically and independent of user interaction.

Figure 5:
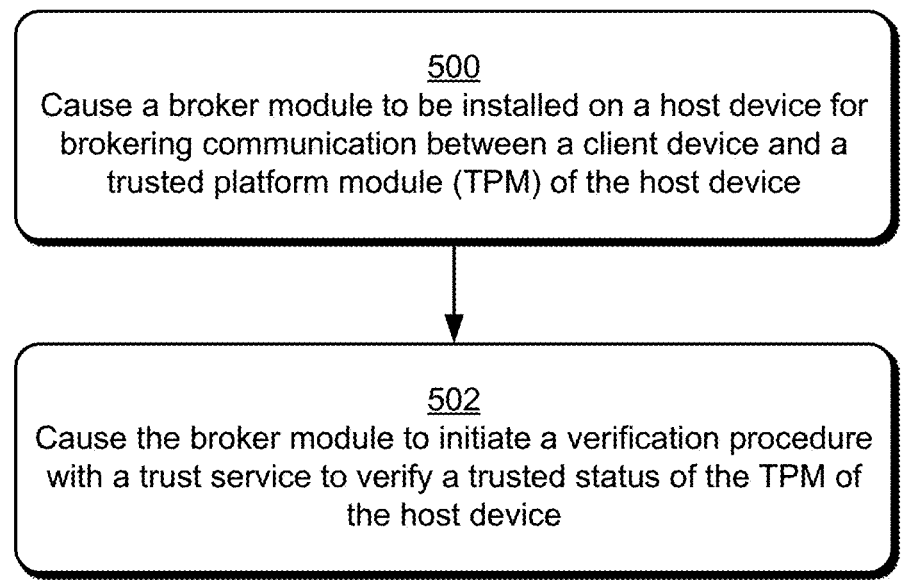
FIG. 5 is a flow diagram that describes steps in a method for enabling communication between a client device and a trusted platform module of a host device in accordance with one or more embodiments.

FIG. 5 is a flow diagram that describes steps in a method in accordance with one or more embodiments. The method, for instance, describes an example procedure for enabling communication between a client device and a trusted platform module of a host device in accordance with one or more embodiments.

Step 500 causes a broker module to be installed on a host device for brokering communication between a client device and a trusted platform module (TPM) of the host device. The client device 102, for instance, communicates a trigger event to the host device 116 for installation of the broker module 146. The host device 116 then obtains the broker module 146 (e.g., from the trust service 144) and installs the broker module 146.

Step 502 causes the broker module to initiate a verification procedure with a trust service to verify a trusted status of the TPM of the host device. For example, the client device 102 communicates an instruction to the broker module 146 to verify with the trust service 144 a trust status of the TPM 120. The trust service 144 then performs a trust verification procedure for the TPM 120, examples of which are discussed elsewhere herein.

Thus, the procedure described above may be employed to set up a host device to enable it's TPM to be provisioned for providing trust-based services for a client device.

Figure 6:
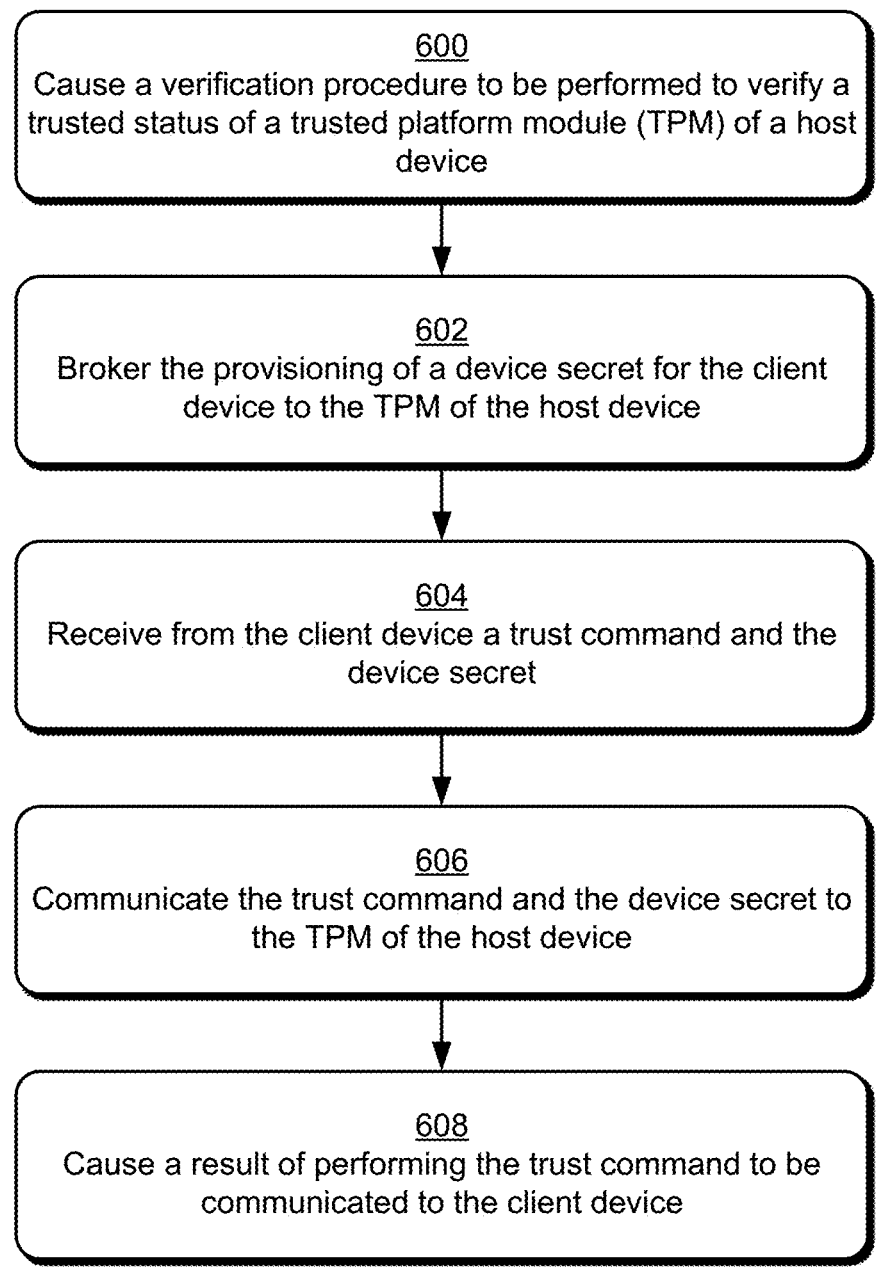
FIG. 6 is a flow diagram that describes steps in a method for enabling a host device to be configured to perform trust commands for a client device in accordance with one or more embodiments.

FIG. 6 is a flow diagram that describes steps in a method in accordance with one or more embodiments. The method, for instance, describes an example procedure for enabling a host device to be configured to perform trust commands for a client device in accordance with one or more embodiments.

Step 600 causes a verification procedure to be performed to verify a trusted status of a trusted platform module (TPM) of a host device. The broker module 146, for instance, communicates the endorsement certificate 130 for the TPM 120 to the trust service 144. In at least some implementations, the broker module 146 communicates the endorsement certificate 130 to the trust service 144 in response to a notification from the client device 102.

Step 602 brokers the provisioning of a device secret for the client device to the TPM of the host device. The broker module 146, for example, receives the device ID 110 from the client device 102, and communicates the device ID 110 to the trust service 144. The trust service 144 returns the device secret 112 to the broker module 146, which then communicates the device secret 112 to the TPM 120 to be used to set the authorization value 136. The device secret generally enables usage of a cryptographic asset of the client device to be controlled. For instance, broker module 146 brokers provision of the device secret 112 to the TPM 120 to enable usage of the device key 138 to be controlled.

According to one or more implementations, the broker module 146 provides an interface between a network port of the host device 116 and the TPM 120. Thus, communication for the TPM 120 received via the network port can be communicated by the broker module 146 to the TPM 120. Further, communication from the TPM 120 for a particular entity (e.g., the client device 102, the trust service 144, and so forth) can be communicated by the broker module 146 from the TPM 120 to the network port for forward to the particular entity.

Step 604 receives from the client device a trust command and the device secret. The broker module 146, for instance, receives the trusted command and the device secret 112 from the client device 102, e.g., in an encrypted form.

Step 606 communicates the trust command and the device secret to the TPM of the host device. For example, the trust command and the device secret 112 are communicated by the broker module 146 to the TPM 120. The broker module 146 may also load the device key 138 into the TPM 120 to enable its use. According to various implementations, this causes the trusted command to be authorized by the TPM 120 by matching the device secret 112 to the authorization value 136 such that the trust command is performed by the TPM 120 using the device key 138. Thus, usage of a cryptographic asset is authorized by providing the device secret 112.

Step 608 causes a result of performing the trust command to be communicated to the client device. For instance, the broker module 146 communicates the result to the client device 102, which causes the client device 102 to perform one or more actions based on the result of performing the trust command. Examples of such actions are detailed below.

Figure 7:
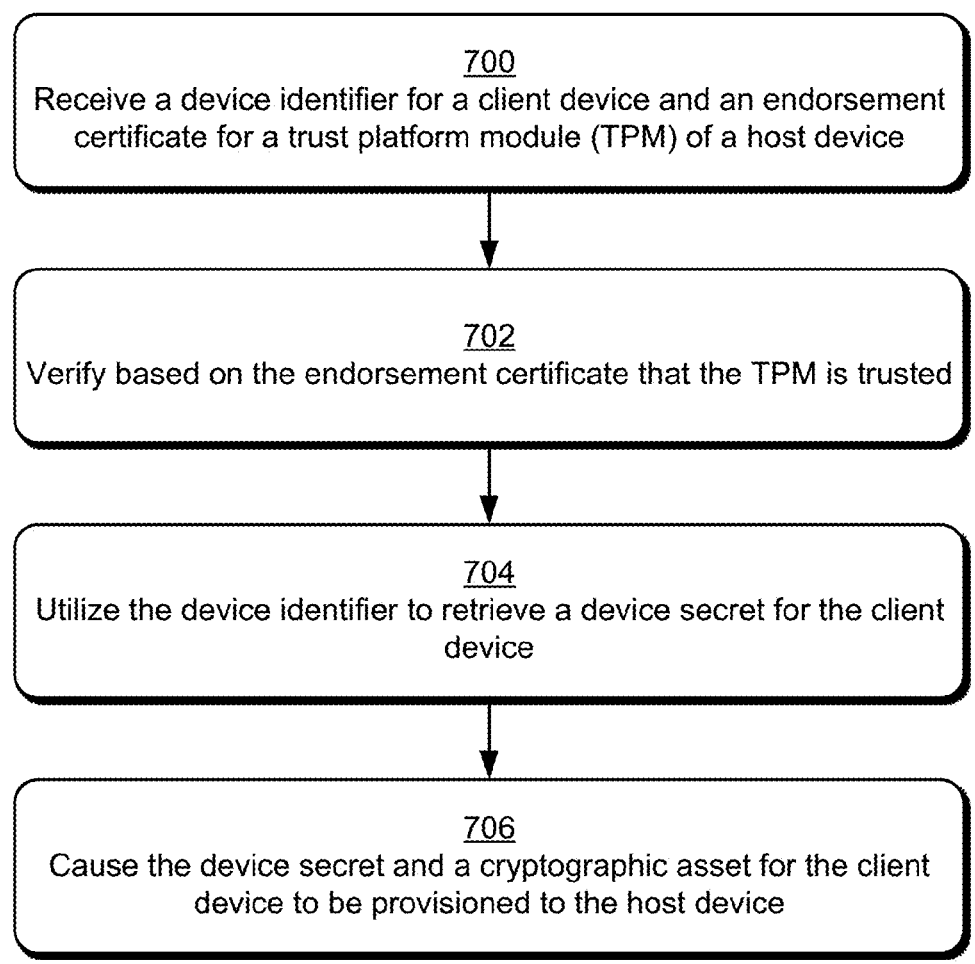
FIG. 7 is a flow diagram that describes steps in a method for provisioning a TPM of a host device to provide trust services for a client device in accordance with one or more embodiments.

FIG. 7 is a flow diagram that describes steps in a method in accordance with one or more embodiments. The method, for instance, describes an example procedure for provisioning a TPM of a host device to provide trust services for a client device in accordance with one or more embodiments.

Step 700 receives a device identifier for a client device and an endorsement certificate for a trust platform module (TPM) of a host device. The trust service 144, for example, receives the device ID 110 and the endorsement certificate 130 from the broker module 146.

Step 702 verifies based on the endorsement certificate that the TPM is trusted. The trust service 144, for instance, queries a TPM authority with the endorsement certificate 130 and/or the endorsement key 132 to ascertain whether the endorsement certificate 130 and/or the endorsement key 132 is associated with a known trusted TPM.

Step 704 utilizes the device identifier to retrieve a device secret for the client device. For example, the trust service 144 queries the device secrets 152 with the device ID 110 to identify the device secret 112 for the client device 102. Generally, the device secrets 152 may include device secrets for multiple different client devices, and individual device secrets are mapped to individual device identifiers for their respective client devices.

Step 706 causes the device secret and a cryptographic asset for the client device to be provisioned to the host device. The trust service 144, for instance, causes the device key 138 to be provisioned to the host device 116, and the authorization value 136 to be set to the device secret 112. As discussed above, the trust service 144 may generate the device key 138 and import the device key 138 to the broker module 146. The broker module 146 passes the device key 138 to the TPM 120, which wraps the device key 138 with the root key 134 for storage on the host device 116. Alternatively, the trust service 144 may prompt the TPM 120 to generate the device key 138 itself, e.g., utilizing the root key 134.

Generally, the authorization value 136 enables usage of the device key 138 to be controlled. Accordingly, a trust command from the client device 102 is performable by the TPM 120 using the device key 138 in response to receiving the device secret 112 from the client device 102.

In at least some implementations, the trust service 144 generates the authorization certificate 158 to accompany the device key 138, and communicates the authorization certificate 158 to the host device 116 for provision to the client device 102. The device key 138 may be used by the TPM 120 to sign the authorization certificate 158 to authenticate an identity of the client device 102.

Figure 8:
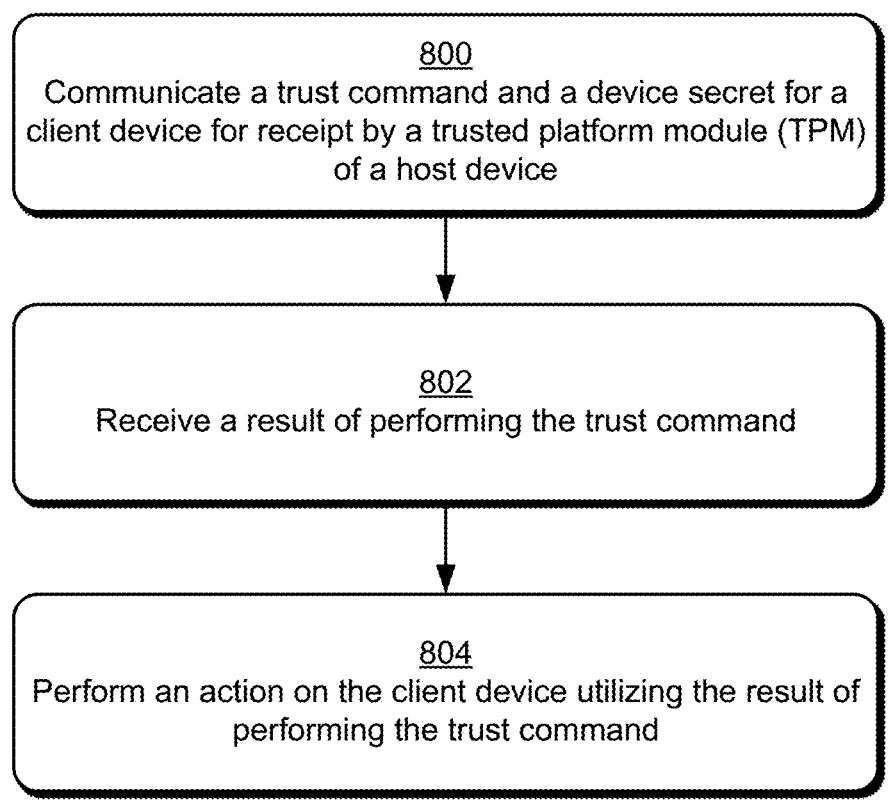
FIG. 8 is a flow diagram that describes steps in a method for causing a TPM of a host device to perform a trust command for a client device in accordance with one or more embodiments.

FIG. 8 is a flow diagram that describes steps in a method in accordance with one or more embodiments. The method, for instance, describes an example procedure for causing a TPM of a host device to perform a trust command for a client device in accordance with one or more embodiments.

Step 800 communicates a trust command and a device secret for a client device for receipt by a trusted platform module (TPM) of a host device. The client device 102, for example, communicates a trust command along with the device secret 112 to the broker module 146, which forwards the trust command and the device secret 112 to the TPM 120. As discussed herein, the trust command can be implemented in various ways. The trust command, for instance, may instruct the TPM 120 to sign the authorization certificate 158 with the device key 138, such as to verify an identity of the client device 102. Various other trust commands can be performed, such as a command to encrypt data with the device key 138, a command to decrypt encrypted data with the device key 138, and so forth.

Step 802 receives a result of performing the trust command. The client device 102, for instance, receives a result of the TPM 120 performing the trust command from the broker module 146. The result of performing the trust command may be embodied in various ways, such as a signed version of the authorization certificate 158, data that is encrypted via the device key 138, data that is decrypted via the device key 138, and so forth.

Step 804 performs an action on the client device utilizing the result of performing the trust command. The client device 102, for example, performs an action based on data received from the broker module 146 as a result of the TPM 120 performing the trust command.

Various types of actions may be performed based on a result performing a trust command. For instance, the result may include decrypted data from a remote entity indicating a change in device settings for the client device 102. The client device 102, for example, may be implemented as a smart appliance, such as a thermostat, a light source, a safety device, a security appliance, and so forth. Thus, the result of performing the trust command may include decrypted data that can be used to perform an action, such as an action to set and/or change appliance settings on the smart appliance. Generally, changing appliance settings may change operational behavior of the client device 102 to optimize device performance, change a way in which data (e.g., sensor input) is collected, change an entity to which data from the client device 102 is communicated, and so forth.

As another example, the result of the trust command may include encrypted data for the client device 102. For instance, the client device 102 may have data to be transmitted to a remote entity, and thus may communicate the data to the TPM 120 for encryption using the device key 138. The broker module 146 may return the encrypted data from the TPM 120, and the action performed may include communicating the encrypted data to a remote entity to avoid exposing the data in the clear to an unauthorized and/or malicious entity.

In yet another example, the result of the trust command may include a signed version of the authorization certificate 158. Thus, the action performed by the client device 102 may include communicating the signed certificate to a third party to authenticate a trusted identity of the client device 102.

Accordingly, security of communications to and from the client device 102 is enhanced via interaction with the broker module 146 and the TPM 120 according to techniques for utilizing a trusted platform module of a host device discussed herein.

Having discussed some example procedures utilizing a trusted platform module of a host device, consider now a discussion of an example system and device in accordance with one or more embodiments.

Example System and Device

Figure 9:
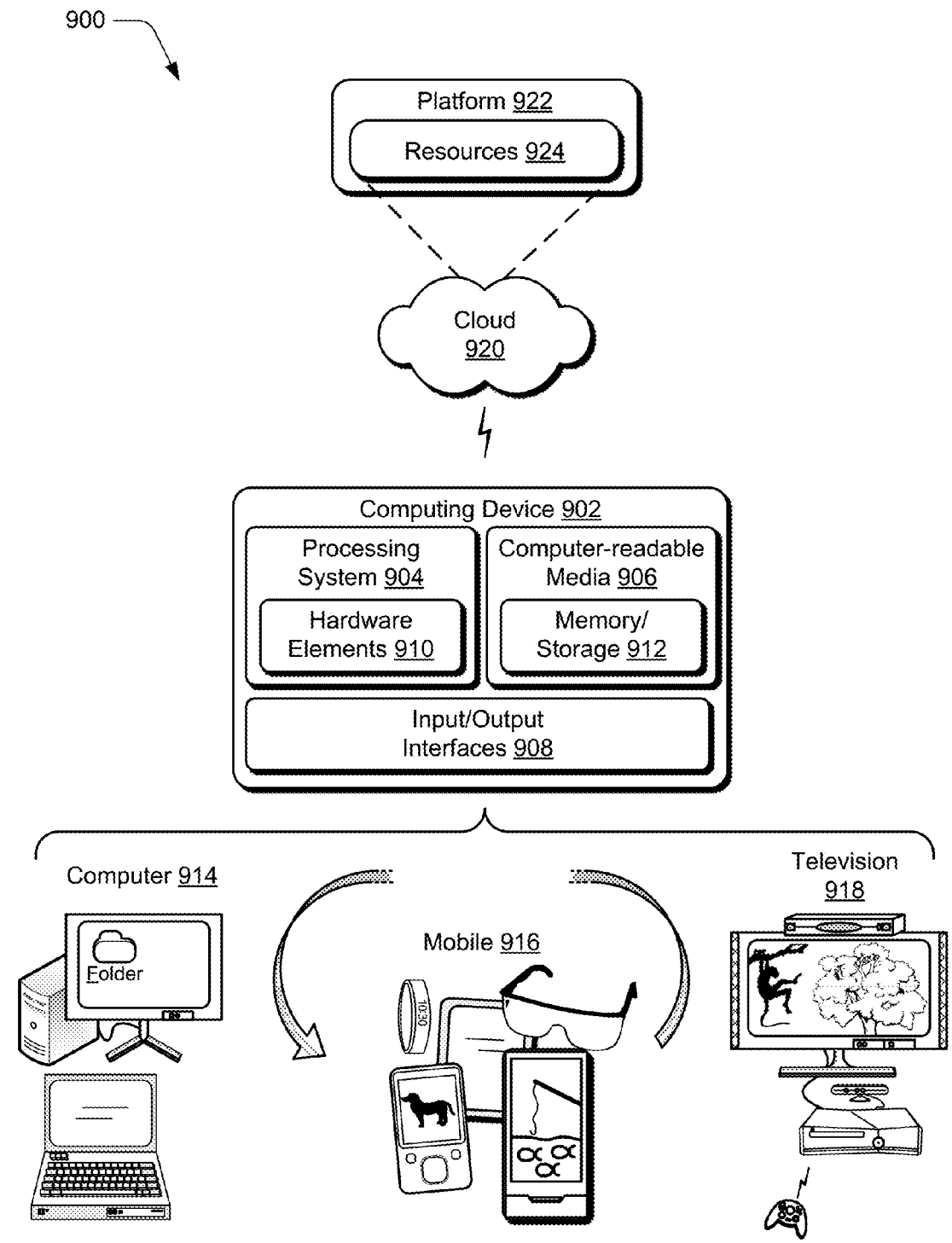
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the host device 116 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a wearable device, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the host device 116 and/or the trust service 144 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Example implementations discussed herein include:

1. An example system including: one or more processors; and one or more computer-readable storage media storing computer-executable instructions that, responsive to execution by the one or more processors, cause the system to perform operations including: brokering the provisioning of a device secret for a client device to a trusted platform module (TPM) of a host device, the device secret enabling usage of a cryptographic asset of the client device to be controlled; receiving from the client device a trust command and the device secret; communicating the trust command and the device secret to the TPM of the host device to cause the trusted command to be authorized by the TPM using the device secret such that the trust command is performed by the TPM using the cryptographic asset; and causing a result of performing the trust command to be communicated to the client device to cause the client device to perform one or more actions based on the result of performing the trust command.

2. The system of example system 1, wherein said brokering is initiated in response to a notification from the client device.

3. The example system of any of the preceding examples 1 or 2, wherein said brokering is performed via interaction between the host device and a trust service.

4. The example system of any of the preceding examples 1-3, wherein the device secret and the cryptographic asset are received via a network interface of the host device, and wherein said brokering includes causing the device secret and the cryptographic asset to be routed from the network interface to the TPM of the host device.

5. The example system of any of the preceding examples 1-4, wherein said brokering is implemented via interaction with a network trust service, and wherein the operations further include, prior to said brokering, causing a verification procedure to be performed with to the network trust service to enable a trust status of the TPM to be verified.

6. The example system of any of the preceding examples 1-5, wherein the operations further include receiving a device identifier from the client device, and wherein said brokering includes communicating the device identifier for the client device to a network-based trust service from which the device secret is received.

7. The example system of any of the preceding examples 1-6, wherein the trust command includes at least one of a request to encrypt data with the cryptographic asset, a request to decrypt data with the cryptographic asset, or a request to sign a security certificate using the cryptographic asset.

8. An example computer-implemented method, including: communicating a trust command and a device secret for a client device for receipt by a trusted platform module (TPM) of a host device; receiving a result of performing the trust command; and performing an action on the client device utilizing the result of performing the trust command.

9. The example method of example 8, wherein said communicating includes communicating an authorization certificate with the trust command, and wherein the trust command includes a command to sign the trust command with a device key maintained by the host device for the client device.

10. The example method of any of the preceding examples 8 or 9, wherein the client device includes a computing device without a locally-installed trusted platform module.

11. The example method of any of the preceding examples 8-10, wherein said communicating and said receiving are performed via a wireless connection between the client device and the host device.

12. The example method of any of the preceding examples 8-11, further including, prior to said communicating: causing a broker module to be installed on the host device for brokering communication between the client device and the TPM of the host device.

13. The example method of any of the preceding examples 8-12, further including, prior to said communicating: causing a broker module to be installed on the host device for brokering communication between the client device and the TPM of the host device; and causing the broker module to initiate a verification procedure with a network-based trust service to verify a trusted status of the TPM of the host device.

14. The example method of any of the preceding examples 8-13, wherein the result of performing the trust command includes at least one of a signed authorization certificate, decrypted data, or encrypted data.

15. The example method of any of the preceding examples 8-14, wherein the action includes changing a configuration setting of the client device based on data included in the result of performing the trust command.

16. An example computer-implemented method, including: receiving a device identifier for a client device and an endorsement certificate for a trust platform module (TPM) of a host device; verifying based on the endorsement certificate that the TPM is trusted; utilizing the device identifier to retrieve a device secret for the client device; and causing the device secret and a cryptographic asset for the client device to be provisioned to the host device such that a usage authorization value for the cryptographic asset is set in the TPM of the host device to the device secret and such that a trust command is performable by the TPM using the cryptographic asset for the client device in response to providing the device secret to the TPM.

17. The example method of example 16, wherein said utilizing includes using the device identifier to look up the device secret in a collection of mappings of device identifiers to device secrets.

18. The example method of any of the preceding examples 16 or 17, wherein said causing includes generating the cryptographic asset and communicating the cryptographic asset and the device secret to the host device.

19. The example method of any of the preceding examples 16-18, wherein said causing includes communicating a notification to the host device for the TPM to generate the cryptographic asset.

20. The example method of any of the preceding examples 16-19, wherein the cryptographic asset includes a cryptographic key, and wherein said causing includes communicating an authorization certificate for the cryptographic key to the host device for provisioning on the client device.

Conclusion

Techniques utilizing a trusted platform module of a host device are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A computer-implemented method, comprising:
  communicating a trust command, a device secret, and a cryptographic asset for a client device that does not include a trusted platform module (TPM) and for receipt by a TPM of a host device via a network interface of the host device, the trust command causing the host device to perform one or more of decrypting data received from a third party, encrypting data to be sent to the third party, or signing an authorization certificate to be sent to the third party, and wherein the device secret enables usage of the cryptographic asset to be controlled;

receiving, from the host device, a result of performing the trust command using the cryptographic asset as authorized by the TPM using the communicated device secret; and performing an action on the client device utilizing the result of performing the trust command.

2. A method as described in claim 1, wherein the action on the client device comprises at least one of:
changing a device setting for the client device;
setting the device setting for the client device;
changing operational behavior of the client device based on the device setting;
changing a sensor input of the client device for collecting data, the sensor input changed based on the device setting; or
changing an entity to which data collected by the client device is communicated.

3. A method as described in claim 1, wherein the action comprises communicating encrypted data to a remote entity effective to avoid exposing the encrypted data to an unauthorized entity, the encrypted data received by the client device from the TPM of the host device as the result of performing the trust command.

4. A method as described in claim 1, wherein the action comprises communicating a signed certificate to the third party to authenticate a trusted identity of the client device, the signed certificate received by the client device from the TPM of the host device as the result of performing the trust command.

5. A method as described in claim 1, wherein provisioning of the device secret is brokered to the TPM of the host device, thereby the device secret and the cryptographic asset are routed from the network interface to the TPM.

6. A method as described in claim 5, wherein the brokering is initiated in response to a notification from the client device.

7. A method as described in claim 5, wherein the brokering is performed via interaction between the host device and a trust service.

8. A method as described in claim 1, further comprising:
communicating a device identifier from the client device to the host device; and
wherein the device identifier for the client device is communicated to a network-based trust service from which the device secret is received.

9. A method as described in claim 1, further comprising:
enabling a trust status of the TPM to be verified according to a verification procedure of a network trust service; and
brokering provisioning of the device secret to the TPM of the host device via interaction with the network trust service after verification of the trust status of the TPM.

10. A host device comprising:
a trusted platform module (TPM) to perform a trust command on behalf of a client device that does not include a TPM;
one or more processors;
a network interface to receive a device secret and a cryptographic asset associated with the client device; and
a computer-readable storage medium having stored thereon multiple instructions that, responsive to execution by the one or more processors, cause the host device to perform operations including:
receiving the trust command and the device secret associated with the client device via the network interface;
in response to receiving the trust command, performing the trust command using the cryptographic asset including performing one or more of decrypting data received from a third party, encrypting data to be sent to the third party, or signing an authorization certificate to be sent to the third party as authorized by the TPM using the device secret;
receiving a result of performing the trust command; and
communicating the result of performing the trust command to the client device effective to cause the client device to perform an action utilizing the result of performing the trust command.

11. A host device as described in claim 10, wherein the operations further include:
enabling a trust status of the TPM to be verified according to a verification procedure of a network trust service; and
brokering provisioning of the device secret to the TPM via interaction with the network trust service after verification of the trust status of the TPM.

12. A computer-implemented method, comprising:
receiving, at a host device having a trusted platform module (TPM), a trust command, a device secret, and a cryptographic asset corresponding to a client device; and
in response to receiving the trust command,
performing, using the cryptographic asset, one or more of decrypting data received from a third party, encrypting data to be sent to the third party, or signing an authorization certificate to be sent to the third party as authorized by the TPM using the device secret;
generating, at the host device, a result of performing the trust command using the cryptographic asset as authorized by the TPM of the host device using the received device secret; and
communicating the result of performing the trust command to the client device effective to cause the client device to perform an action utilizing the result of performing the trust command.

13. A method as described in claim 12, further comprising brokering provisioning of the device secret to the TPM of the host device to route the device secret and the cryptographic asset from the network interface to the TPM.

14. A method as described in claim 13, wherein the brokering is initiated in response to a notification from the client device.

15. A method as described in claim 13, wherein the brokering is performed via interaction between the host device and a trust service.

16. A method as described in claim 12, further comprising:
receiving a device identifier from the client device; and
communicating the device identifier of the client device to a network-based trust service from which the device secret is received.

17. A method as described in claim 12, further comprising:
enabling a trust status of the TPM to be verified according to a verification procedure of a network trust service; and brokering provisioning of the device secret to the TPM of the host device via interaction with the network trust service after verification of the trust status of the TPM.

18. A method as described in claim 12, wherein the action on the client device comprises at least one of:
- changing a device setting for the client device;
- setting the device setting for the client device;
- changing operational behavior of the client device based on the device setting;
- changing a sensor input of the client device for collecting data, the sensor input changed based on the device setting; or
- changing an entity to which data collected by the client device is communicated.

19. A method as described in claim 12, wherein the action on the client device comprises communicating encrypted data to a remote entity effective to avoid exposing the encrypted data to an unauthorized entity, the encrypted data received by the client device from the TPM of the host device as the result of performing the trust command.

20. A method as described in claim 12, wherein the action comprises communicating a signed certificate to the third party to authenticate a trusted identity of the client device, the signed certificate received by the client device from the TPM of the host device as the result of performing the trust command.

* * * * *